Aug. 18, 1925.

J. P. SMITH 1,550,003

TRACTOR HARROW

Filed April 17, 1922  3 Sheets-Sheet 1

Inventor:
John P. Smith,
By H.P. Doolittle,
Atty.

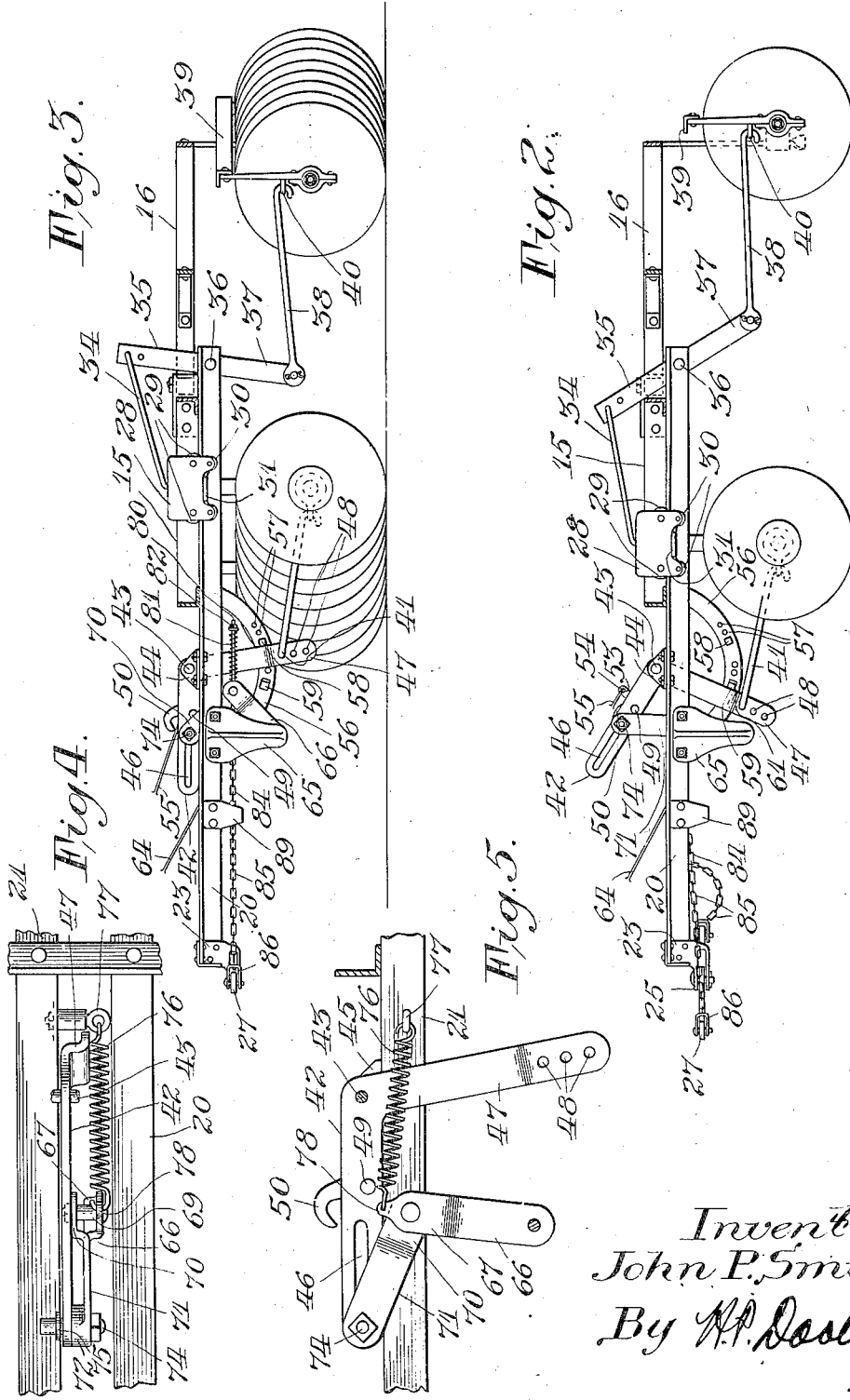

Aug. 18, 1925.
J. P. SMITH
TRACTOR HARROW
Filed April 17, 1922   3 Sheets-Sheet 3
1,550,003
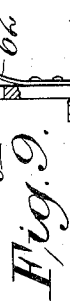
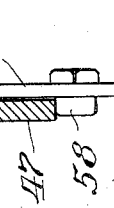
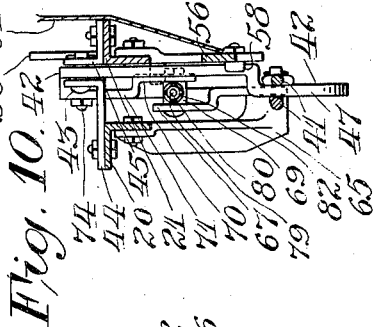
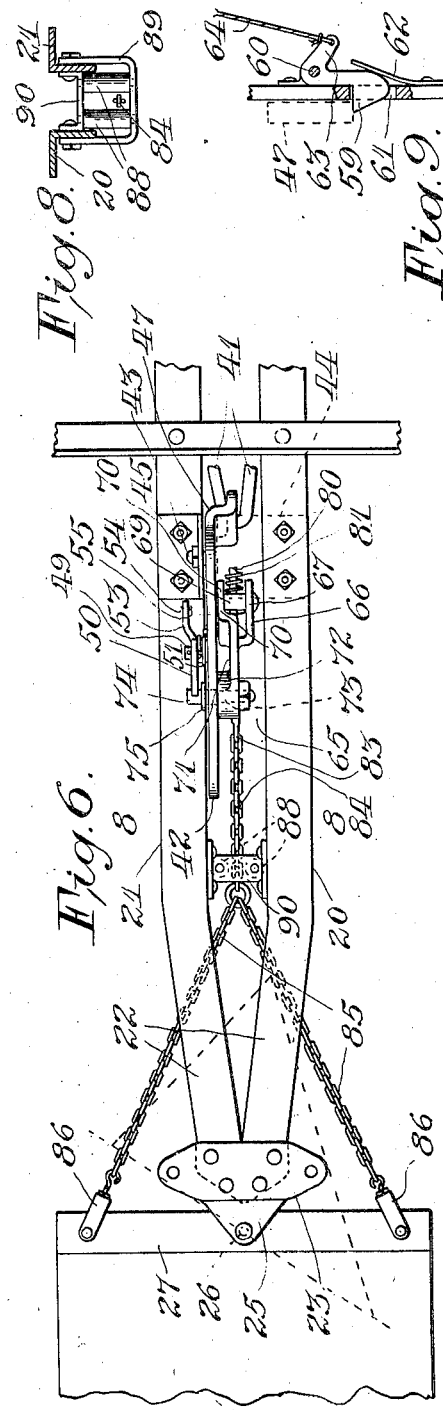
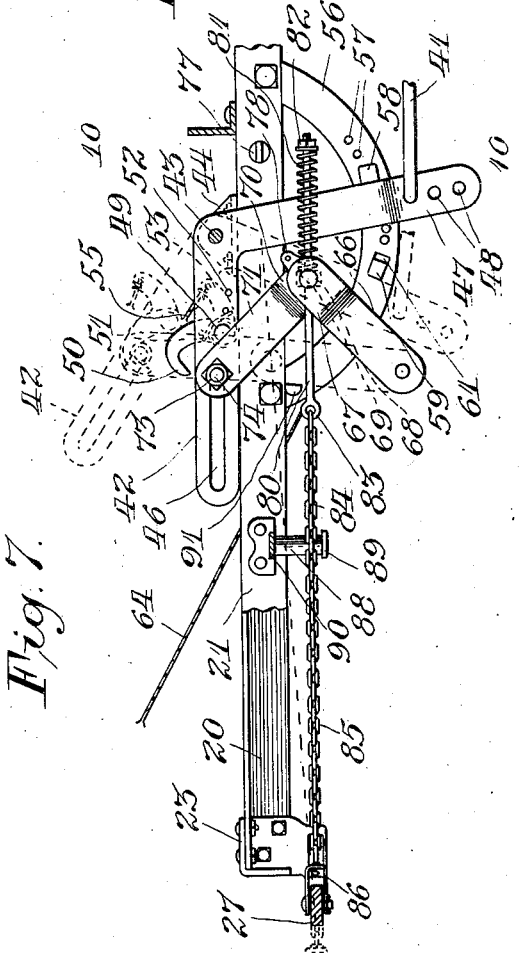
Inventor.
John P. Smith,
By H.P. Doolittle
Atty.

Patented Aug. 18, 1925.

1,550,003

UNITED STATES PATENT OFFICE.

JOHN P. SMITH, OF CHICAGO, ILLINOIS, ASSIGNOR TO INTERNATIONAL HARVESTER COMPANY, OF CHICAGO, ILLINOIS, A CORPORATION OF NEW JERSEY.

TRACTOR HARROW.

Application filed April 17, 1922. Serial No. 553,779.

*To all whom it may concern:*

Be it known that I, JOHN P. SMITH, a citizen of the United States, residing at Chicago, in the county of Cook and State of Illinois, have invented certain new and useful Improvements in Tractor Harrows, of which the following is a full, clear, and exact specification.

This invention relates to a double or tandem disk harrow and more particularly to a device for angling and straightening the gangs of the harrow.

The objects of the invention are to provide an improved and simple construction of mechanism through which the position of the gangs is controlled by the turning or steering of the draft means, such for instance as the tractor or horses, in a direction to the right or left of the normal straight forward path of travel across the field, and to incorporate in said mechanism a device by which the draft applying power can be made to positively angle or straighten the gangs by direct action in turning or can be turned without direct action on the gangs.

The foregoing objects are accomplished by providing a supplemental draft element which is connected with a toggle link mechanism on a harrow in a manner to actuate the toggle link mechanism when the draft means is turned or steered from its normal or straight forward path, and also by means of a slidable connection between the toggle link connection and the crank arm, the device may be held inoperative or ineffective to the turning of the draft power. The main objects stated, as well as the incidental improvements which will appear from the following description, are attained by the organization and details of construction or their equivalents set forth in the following specification and defined in the claims.

Referring to the drawings:

Fig. 2 is a side elevational view of Fig. 1 showing the gangs in their straightened position;

Fig. 3 is a side elevational view of the disk harrow showing the gangs in their angling position;

Figs. 4 and 5 are enlarged top plan and side elevational views respectively of the adjusting crank and toggle link mechanism;

Figs. 6 and 7 are enlarged top plan and side elevational views respectively showing the manner in which the harrow is connected to the tractor;

Fig. 8 is a detail cross sectional view taken on the lines 8—8 of Fig. 6;

Fig. 9 is a detail cross sectional view of the spring latch which locks the gang control crank; and Fig. 10 is a detail cross sectional view of a section taken on the line 10—10 in Fig. 1.

Figure 1:
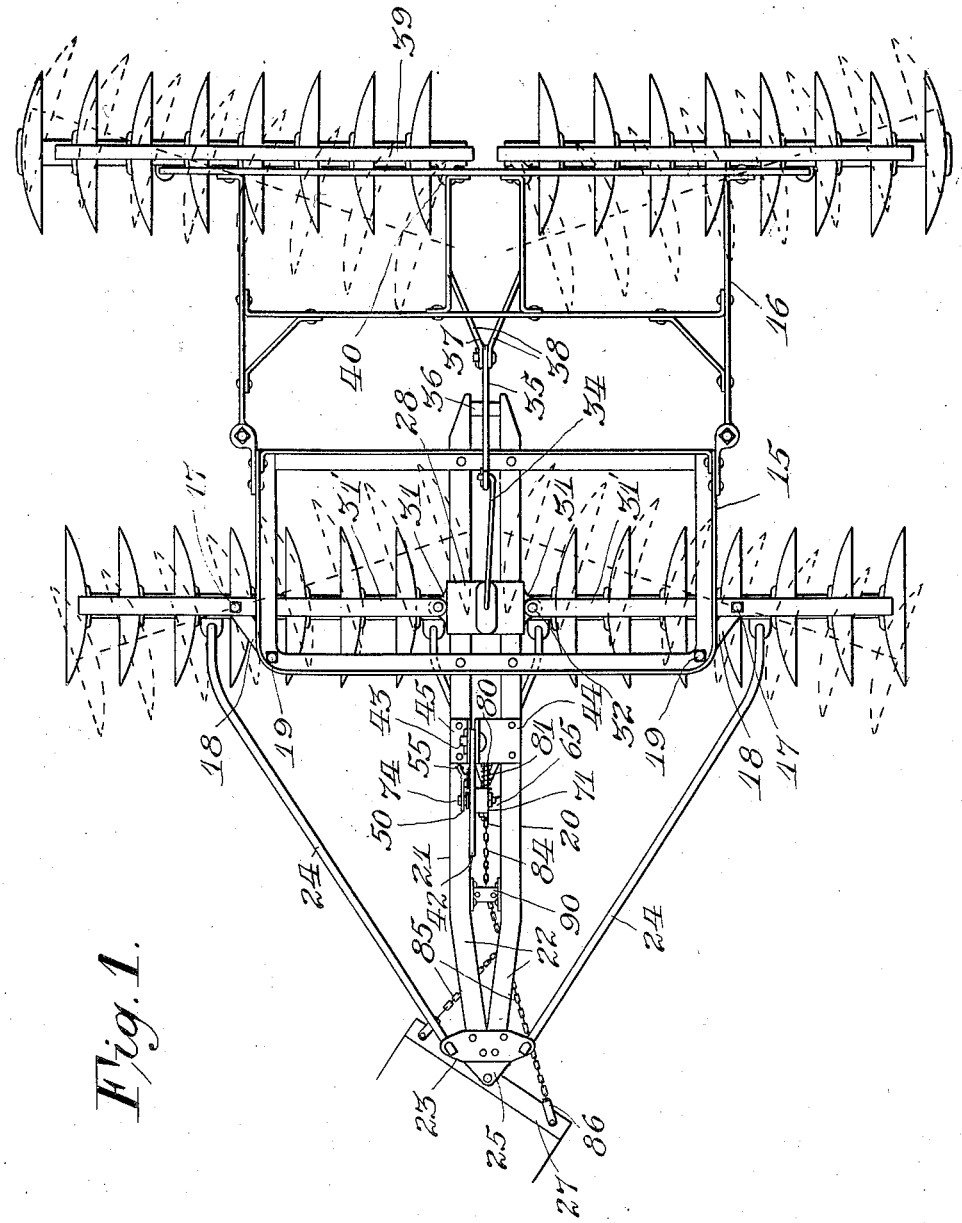
Fig. 1 is a top plan view of a disk harrow embodying my improved angling device.

In the present instance I have illustrated the improvements constituting my invention in connection with a tandem disk harrow comprising a front frame or section 15 and a rear frame or section 16, each provided with the usual pair of pivoted disk gangs. The gangs on the front frame are preferably connected to the frame by being pivoted at 17 to the links 18 connected to the forward angles of the frame at 19. The front frame includes a pair of longitudinally extending spaced angle draft bars 20 and 21 which project forwardly from the frame proper and converge at 22. The converged ends 22 are secured together by a cross bracket 23 fixed to their outer ends to which is secured the brace bars 24 which are connected to the gangs in proximity to their pivot point. The cross bracket 23 is provided with a forwardly extending ear 25 which is apertured at 26 for the purpose of pivotally securing the draft bars 20 and 21 to a transverse draft bar 27 fixed to the draft appliance or tractor. On the rear ends of the draft angle bars 20 and 21 there is mounted a gang connecting member comprising a saddle shaped plate 28 which straddles the angle bars. Loosely journaled on the plate 28 are rollers 29 which bear on the upper surfaces of the angle bars and have enlarged central portions engaged in the space between them. The plate 28 also carries the rollers 30 to engage the under surface of the bars 20 and 21. Both sides of the plate 28 are provided with lateral ears 31 to which are pivoted the gang frames 31'. Pivotally secured to the plate 28 is a rearwardly extending connecting rod 34 pivotally secured to lever 35 pivoted to the angles 20 and 21 at 36. The lever 35 is provided with a downwardly extending arm 37 which is pivotally connected to rearwardly extending rods 38 connected to the rear gangs 39 at 40. Secured to the forward gang frames below the pivotal connections 32 are rearwardly connecting rods 41. The above described mechanism constitutes a regular tandem disk harrow. This construction per se does not form any part of the present invention.

My improved angling device comprises a gang controlling bell-crank 42 pivoted to the angles 20 and 21 at 43 by means of brackets 44 and 45 fixed to the angles 20 and 21 respectively. The crank 42 is provided with an elongated slot 46 at its forward end and, at its lower end, with an arm 47. The downwardly projecting arm 47 of the crank 42 is provided with a plurality of apertures 48 which are adapted to receive the connecting rods 41 for angularly adjusting the gangs. Pivotally mounted on the crank 42 at 49 is a latch member 50. The latch member 50 is normally held in the position shown in Fig. 7 by a coil spring 51 and stop 52. The stop 52 normally engages an arm 53 formed integrally with the latch 50. The arm 53 is provided with an aperture 54 adapted to receive a cord 55 which extends forwardly to within easy reach of the operator on the draft appliance or tractor. Secured to the draft angle 21 is a quadrant member 56. The quadrant 56 is provided with a series of apertures 57 adapted to receive a bolt 58 to form a stop for the crank arm 47 as shown in Fig. 7. The quadrant 56 is further provided with a spring press latch or pawl 59 pivoted thereto at 60 and adapted to protrude through an aperture 61 of the quadrant 56. The pawl 59 is normally held in the position shown in Fig. 9 by a flat spring 62 fixed to the quadrant 56. Formed integrally with the pawl 59 is a laterally extending arm 63 which is adapted to receive a cord or rope 64. The rope 64 extends forwardly to within easy reach of the operator on the draft appliance or tractor. It will be noted that as the crank arm 47 is swung from the full line position shown in Figs. 7 and 9 to dotted line position shown in these figures, the pawl 59 will engage the arm and lock the same in the dotted line position. Pivotally mounted on a downwardly extending bracket 65 fixed to the draft angle 20 is a toggle link 66 having an off-set portion 67 and an aperture 68. Pivotally secured in the aperture 68 is a swiveling bracket 69 which is pivotally secured to the off-set portion 70 of the toggle link 71. The toggle link 71 is provided with a boss 72 and aperture 73. Secured in the aperture 73 and extending through the slot 46 is a shoulder stud 74. The stud 74 is provided with a shoulder or collar 75 to slidably secure the toggle link 71 to the crank 42.

It will be noted from this construction that the latch 50 is adapted to be swung downwardly against the tension of the spring 51 to engage and lock the stud 74, or rather, the toggle link 71 in the rearward end of the slot 46 of the crank 42. The toggle link mechanism 66—71 is normally held in the position shown in full lines in Fig. 7 by means of a spring 76 fixed to the angle 21 at 77 and to the upper end of the toggle link 66 at 78. The swiveling bracket 69 is provided with a longitudinally extending aperture 79 adapted to receive a reciprocating rod 80. Positioned between the rear end of the rod 80 and the swiveling bracket 69 is a coil spring 81 held in position by a washer and nut 82 threaded on the rod 80. The forward end of the rod 80 is provided with an eye 83 adapted to receive a chain 84. The forward end of the chain 80 is connected to two diverging chains 85 which in turn are connected by means of adjustable brackets 86 to the transverse bar 27 fixed to the draft appliance. In order to guide the chain 84 in its reciprocating movement, I have provided oppositely disposed rollers 88 journaled in the brackets 89 and 90 fixed to the draft angles 20 and 21 respectively. In order to prevent the toggle link mechanism from passing over center in its forward movement, I have provided a stop 91 fixed to the quadrant 56 and adapted to engage the lower end of the toggle link 71 when the toggle link mechanism has assumed the dotted line position shown in Fig. 7.

In the operation of my improved disk harrow angling device, let us assume that the gangs of the harrow are in the position shown in the full lines in Fig. 1. In this position the crank arm 47 of the crank 42 is locked by the pawl 59 as clearly shown in Fig. 2. From this position, if the operator desires to angle the gangs, the cord or rope 64 is drawn forwardly so as to release the pawl 59 from the crank arm 47, then by pulling straight forward, the gangs are angled by reason of the resistance of the disks in the ground and immediately assume the position shown in the dotted lines in Fig. 1 and also shown in Fig. 3. If the operator desires to straighten the gangs from their angled position, he pulls on the cord 55, thus swinging the latch or pawl 50 into engagement with the stud 74 and thereby locking the pivot of the toggle link 71 in the rearward end of the slot 46. Then by steering or turning the draft appliance to the right or to the left as shown in Figs. 1, 2 and 6, one of the two chains is drawn forwardly by reason of this pivotal action, thus drawing the reciprocating rod 80 forwardly and swinging the toggle link from the full line position shown in Fig. 7 to the dotted line position and thereby swinging the crank 42 to the position shown in dotted lines in said last named figure and thus, by reason of the connecting rods 41, 34 and crank 35 and connection 38, the angles are swung into their straightened position or the position shown in Fig. 2.

While the construction of my improved angling device is shown here as embodied in a rigid frame type of harrow, it should be understood that the construction may be employed in a flexible type of harrow also, that is, in a construction in which the two frames may move relatively with respect to each other.

In connection with the operation of my improved angling device, it will be understood that the same may be held inoperative or ineffective to the turning or steering of the draft appliance. In other words, if it is the desire of the operator to turn or steer the tractor either to the right or left without affecting or changing the angles of the gangs, the same may be accomplished by means of my improved construction. This mechanism is held inoperative or ineffective for angling the gangs when the latch 50 is normally held in its full line position by the spring 55 shown in Fig. 7. Then by turning the draft bar 27 to the left or right by the draft appliance as shown in Fig. 6, either one of the chains 85 is drawn forwardly and thus, through the chain 84 and reciprocating rod 80 and spring 81, the toggle links 66 and 71 are drawn forwardly sliding the stud 74 forwardly in the slot 46 of the crank 42 as shown in Figs. 4 and 5, thus effecting no movement of the crank 42 or its arm 47 and thereby permitting the front and rear gangs to maintain their angling position in turning or steering to the right or to the left. It will also be noted that any excess in turning or drawing forwardly of the chains 85 and 84 is compensated for by the compression spring 81 mounted on the reciprocating rod 80, and also that the return of the toggle links 66 and 71 to their normal position, that is, the full line position shown in Fig. 7, is accomplished by means of the spring 76. Adjusting apertures 48 have been provided in the crank arm 47 of the crank 42 for changing the throw or angle of the front and rear gangs if such an adjustment is desired by the operator. An additional adjustment is provided by the apertures 57 in the quadrant 56 for varying the throw of the crank arm 47 of the crank 42.

While I have described in the above specification one embodiment which my invention may assume in practice, it is to be understood that modification may be made without departing from the spirit and scope of my invention as expressed in the following claims.

What I claim as my invention and desire to secure by Letters Patent is:

1. The combination of a frame, an adjustable earth working implement connected thereto, mechanism on the frame for adjusting the implement, and actuating means for said adjusting mechanism comprising a single transversely extending draft member pivoted to the frame and movable angularly by change in direction of draft, and connections extending between points on each side of the pivot of said draft member and said adjusting mechanism.

2. The combination of a frame, an adjustable earth working implement connected thereto, mechanism on the frame for adjusting the implement, and actuating means for said adjusting mechanism comprising a single transversely extending draft member centrally pivoted to the frame and movable angularly by change in direction of draft and having each of its ends flexibly connected to said adjusting means.

3. The combination of a frame, an adjustable earth working implement connected thereto, mechanism on the frame for adjusting the implement, actuating means for said adjusting mechanism comprising a single transversely extending draft member pivoted to the frame and movable angularly by change in direction of draft and operatively connected to said adjusting means, and means for controlling the action of said actuating means.

4. The combination of a frame, a draft element attached to the frame and movable relatively thereto upon change in the direction of draft, an angularly adjustable earth working implement on the frame, mechanism on the frame for adjusting the implement, and actuating means for said adjusting mechanism comprising diverging connections having united ends connected to said mechanism and their other ends connected to the draft element at spaced points thereon.

5. The combination of a frame, a horizontally swinging draft element attached to the frame and movable towards either side upon like change in the direction of draft, an angularly adjustable earth working implement on the frame, mechanism on the frame for adjusting the implement, and actuating means for said adjusting mechanism comprising chains connected to said mechanism and having diverging branches connected to the draft element at spaced points thereon.

6. In a disk harrow comprising a frame and an angularly adjustable disk gang pivoted thereon, the combination of adjusting means for the gang comprising a lever pivoted on the frame and having one arm connected to the disk gang, a toggle having one member pivoted on the frame and another connected to the other arm of the lever, and draft actuated means for extending the toggle.

7. In a disk harrow comprising a frame and an angularly adjustable disk gang pivoted thereon, the combination of adjusting means for the gang comprising a lever pivoted on the frame and having one arm connected to the disk gang, a toggle having one member pivoted on the frame and another connected to the other arm of the lever, and draft actuated means for extending the toggle comprising a transversely extending draft member pivoted to the frame and connected to said toggle.

8. In a disk harrow comprising a frame and an angularly adjustable disk gang pivoted thereon, the combination of adjusting means for the gang comprising a lever pivoted on the frame and having one arm connected to the disk gang, a toggle having one member pivoted on the frame and another connected to the other arm of the lever, and draft actuated means for extending the toggle, comprising a transversely extending draft member pivoted intermediate its ends to the frame and flexible connections between each end of said member and the toggle.

In testimony whereof I affix my signature.

JOHN P. SMITH.